UNITED STATES PATENT OFFICE.

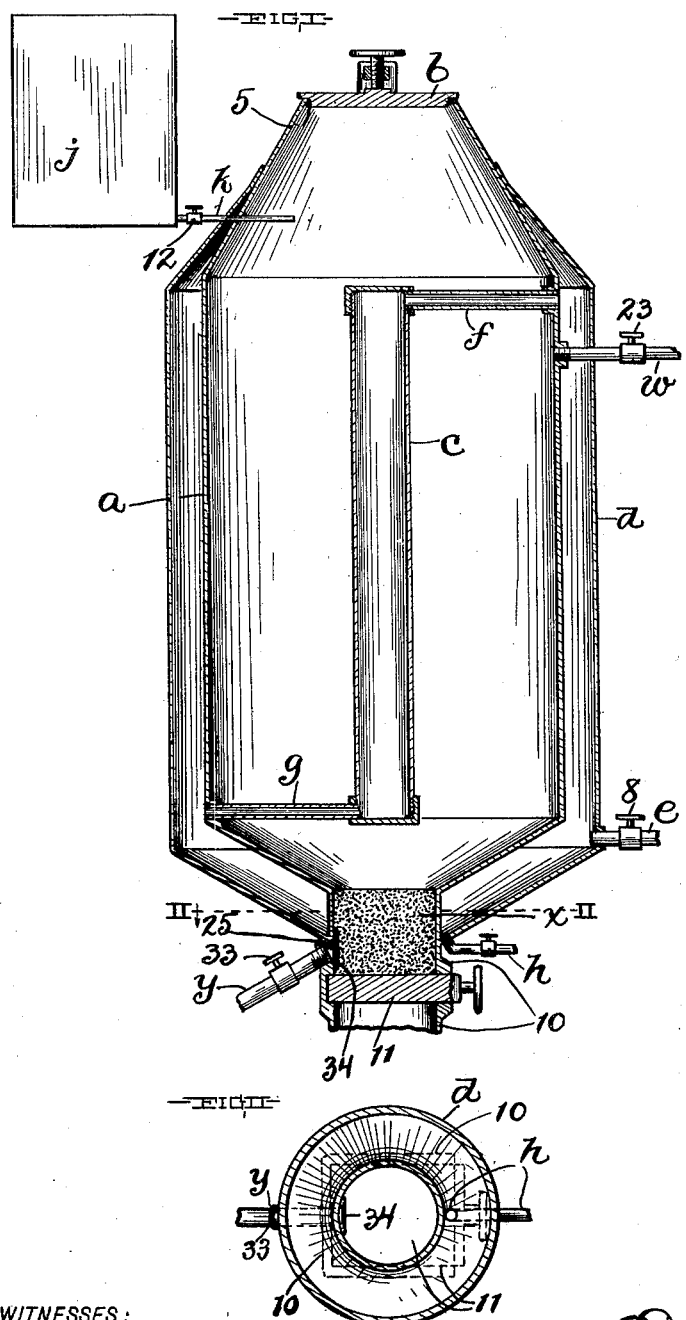

EUGENE R. EDSON, OF CLEVELAND, OHIO.

PROCESS OF OBTAINING GELATIN-YIELDABLE LIQUIDS.

SPECIFICATION forming part of Letters Patent No. 703,240, dated June 24, 1902.

Application filed October 9, 1901. Serial No. 78,097. (No specimens.)

*To all whom it may concern:*

Be it known that I, EUGENE R. EDSON, a resident of Cleveland, in the county of Cuyahoga and State of Ohio, have invented certain new and useful Improvements in Obtaining Gelatin-Yieldable Liquids from Fish and other Gelatin-Yieldable Material; and I hereby declare the following to be a full, clear, and exact description of the invention, such as will enable others skilled in the art to which it pertains to make and use the same.

This invention relates to improvements in reducing or rendering fish or fish waste or other gelatin-yieldable material to obtain a congealable gelatin-yieldable liquid.

The object of this invention is to filter the gelatin-yieldable liquid after the extraction of the same from the mass of material undergoing treatment with heat while the same is still heated to a temperature high enough to prevent fermentation of foreign matter or impurities in the liquid before the drainage of the liquid from the apparatus.

With this object in view the invention consists in the steps or peculiarities hereinafter described, and pointed out in the claims.

In the accompanying drawings, Figure I is a side elevation, largely in section, of apparatus suitable for carrying out the improved process which constitutes the subject-matter of this application. Fig. II is a top plan in horizontal section on line II II, Fig. I, with the filtering material $x$ omitted.

Referring to the drawings, $a$ designates a vertically-arranged upright receptacle into which the gelatin-yieldable material—fish waste or other matter—is introduced for treatment. The receptacle $a$ is closed, being provided at its upper end and centrally with a manhole or charging aperture or inlet 5 and a cover $b$, which is arranged to close the said inlet. The material requiring treatment is introduced into the receptacle at the inlet 5. The cover $b$ is secured in its closed position in any approved manner.

The receptacle $a$ is provided centrally with a core-forming heating-drum $c$, which is arranged vertically and extends from near the upper end to near the lower end of the receptacle. The drum $c$ is supported in any approved manner from the receptacle $a$.

A closed heating-jacket $d$ surrounds the receptacle $a$ and extends from the upper end to and below the lower end of the receptacle $a$. The jacket $d$ comprises a casing whose chamber surrounds the receptacle $a$ and is in open relation at its lower end with a valved pipe $e$ for supplying the heating agent—steam or whatever it may be—to the said chamber. The chamber of the jacket $d$ is connected by pipes $f$ and $g$ with the upper end and lower end, respectively, of the chamber of the drum $c$. The connections of the drum $c$ and the jacket $d$ by the pipes $f$ and $g$ establishes circulation through the said drum and pipes, so as to cause the fluid within the chambers of the drum and jacket to be maintained at a uniform temperature. The jacket $d$ is preferably provided at its lower extremity with a valved drain-pipe $h$.

The receptacle $a$ is provided at its lower end and centrally with a downwardly-extending valved pipe 10, at which is discharged the residue remaining after the drainings of the gelatin-yieldable liquid from the material treated within the said receptacle. The valve 11 of the outlet 10 is a slide-valve, which is normally closed.

The valved pipe $k$, arranged to discharge into the upper portion of the receptacle $a$, leads from a compressed-air reservoir $j$, in which compressed air or other aeriform or gaseous fluid under pressure is stored. The valve 12 of the pipe $k$ is normally closed.

A valved water-supply pipe $w$ extends through the jacket $d$ and is arranged to discharge into the receptacle $a$. The valve 23 of the pipe $w$ is normally closed. If the moisture contained within the material undergoing treatment is not sufficient in quantity to enable a satisfactory extraction or flowing from the material undergoing treatment of the glue or gelatin contained in the material, additional moisture is supplied by opening the valve 23 of the pipe $w$, so as to permit water to flow from the said pipe into the receptacle $a$.

The slide-valve 11 of the pipe 10 is located a suitable distance below the upper end of the pipe outside of and below the jacket $b$, and the said pipe is filled or supplied between the said valve and its upper extremity with filtering material $x$. The pipe 10 between its valve 11 and its upper extremity is provided with a lateral aperture 25, which is in open relation with the drain-pipe *y*. The pipe *y* is provided with a valve 33 for establishing or interrupting continuity in the passage-way through the said pipe. The valve 33 is normally open, so that the gelatin-yieldable liquid extracted from the material undergoing treatment within the receptacle through the pipe *y*.

Obviously by the construction hereinbefore described the gelatin-yieldable liquid is filtered before it reaches the pipe *y*, and a screen 34, suitably applied at the receiving end of the aperture 25, prevents ingress of any large particles of filtering material from the pipe 10 into the said pipe *y*.

By the extension of the heating-jacket to and around the filtering-material-containing portion of the discharge-pipe 10 the gelatin-yieldable liquid is maintained adequately heated until it is filtered, being exposed to a high enough heat to prevent fermentation until foreign matter or impurities have been removed from the said liquid by the filtering material.

Obviously the filtering material within the pipe 10 upon opening the valve 11 after the treatment of a body of material within the receptacle *a* is discharged, with the residue, from the said pipe.

In operating the apparatus the cover *b* of the receptacle *a* is opened and material requiring treatment is introduced at the inlet 5. When the receptacle *a* has been supplied with material at the inlet 5, the cover *b* is closed. The valve 8 of the pipe *e* is opened, so as to supply steam or heating fluid to the chamber of the jacket *d* and by means of the pipes *f* and *g* to the chamber of the drum *c*. Steam is preferably employed, and a pressure of steam sufficient to heat the mass within the receptacle *a* quickly and thoroughly to more than 212° Fahrenheit—say a pressure of about fifteen pounds—may be employed; but so high a pressure of steam would, unless the mass were kept quiet by some other agency, result in heating and agitating the mass to such an extent as to result in a destruction of or injury to the capacity of the gelatin-yieldable liquid to congeal after the drainage of the said liquid from the receptacle, and consequently air or other aeriform or gaseous fluid under sufficient pressure is admitted to the receptacle *a*, preferably on top of the mass within the said receptacle, by the pipe *k* upon opening the valve 12 of the said pipe. An adequate pressure of air or other aeriform or gaseous body admitted upon top of the mass within the receptacle *a* has been found necessary to prevent an ebullition or agitation of the mass by the heat or fermentation within the mass, and a pneumatic pressure of twenty pounds per square inch on top of the mass has been found very sufficient against fifteen pounds of steam-pressure employed in heating the mass. Fish or fish waste is more liquid than solid, and the gelatin-yieldable liquid and any oil contained in the said material become readily liberated during the treatment of the material within the receptacle *a*. The oil rises and accumulates on top of the mass within the said receptacle and can be removed, if desired, in any approved manner. The extracted gelatin-yieldable liquid flows downwardly to and through the filtering material *x* within the pipe 10 and thence escapes through the drain-pipe *y*. Obviously the pneumatic pressure upon the mass of material undergoing treatment facilitates the flow of gelatin-yieldable liquid from the mass; but the filtering of the said liquid during the draining period and maintaining the liquid adequately heated preparatory to and during the filtering operation, so as to prevent fermentation of or other injury to the liquid before the liquid has been filtered, constitutes the subject-matter desired to be covered in this application.

A complete elimination of impurities from the gelatin-yieldable liquid can only be effected by draining the liquid through a mass or body of filtering material, and the liquid must be purified before any fermentation can set in, and the maintenance of the liquid during its passage through the body of filtering material at a temperature high enough to prevent fermentation is essential.

The rendering apparatus disclosed in this application is shown, described, and claimed in the specification of an application for United States Letters Patent, No. 59,695, filed by me May 10, 1901, and the process of obtaining a gelatin-yieldable liquid by a pneumatic pressure upon the mass of material being heated to prevent ebullition or agitation by the pressure resulting from the heat is described and claimed in the specification of an application for United States Letters Patent, No. 67,970, filed by me July 12, 1901.

What I claim is—

An improvement in the production of gelatin-yieldable liquid from gelatin-yieldable material, comprising the heating of the material within a receptacle and draining or flowing gelatin-yieldable liquid from the receptacle through a body or mass of filtering material and maintaining the liquid adequately heated preparatory to and during the filtering operation so as to prevent fermentation of the liquid before the liquid has been filtered.

Signed by me at Cleveland, Ohio, this 12th day of September, 1901.

EUGENE R. EDSON.

Witnesses:
C. H. DORER,
VICTOR C. LYNCH.